United States Patent [19]
Kaczmarek et al.

[11] Patent Number: 5,152,050
[45] Date of Patent: Oct. 6, 1992

[54] NON-SYNCHRONOUS ASSEMBLY SYSTEM

[76] Inventors: James S. Kaczmarek, 21317 Woodhill, Northville, Mich. 48167; Kenneth C. Kareta, 39648 Cadborough, Mount Clemens, Mich. 48044

[21] Appl. No.: 685,121

[22] Filed: Apr. 12, 1991

Related U.S. Application Data

[60] Continuation of Ser. No. 493,506, Mar. 14, 1990, abandoned, which is a division of Ser. No. 259,216, Oct. 18, 1988, Pat. No. 4,928,383.

[51] Int. Cl.⁵ .............................................. B23P 21/00
[52] U.S. Cl. ........................................ 29/711; 29/791; 29/822
[58] Field of Search ............... 29/407, 429, 430, 431, 29/711, 791, 822, 823

[56] References Cited

U.S. PATENT DOCUMENTS

| | | |
|---|---|---|
| 3,648,346 | 3/1972 | Graham et al. |
| 4,411,354 | 10/1983 | Thibault et al. |
| 4,548,346 | 10/1985 | Kraus et al. |
| 4,583,634 | 4/1986 | Kraus et al. |
| 4,667,866 | 5/1987 | Tobita et al. |
| 4,720,231 | 1/1988 | Pienta. |
| 4,734,979 | 4/1988 | Sakamoto et al. |
| 4,738,022 | 4/1988 | Sakamoto et al. |
| 4,738,387 | 4/1988 | Jaufmann et al. |
| 4,928,383 | 5/1990 | Kaczmarek et al. |

Primary Examiner—Timothy V. Eley

[57] ABSTRACT

A permanently installed manufacturing system, to join together loose part sub-assemblies with quick change workstations and exchange tool transporters. The flexible manufacturing process involves the automatic, or manual, joining of loose components, regardless of the assembly technology used, the model mix required, or the type of product to be assembled. The system allows the utilization of interchangeable flex-tools, supported on various types of power and free transporters, that can be programmably controlled and automatically changes over. The system will accommodate batch runs, random runs, prototype runs, as well as synchronous and asynchronous operations.

7 Claims, 10 Drawing Sheets

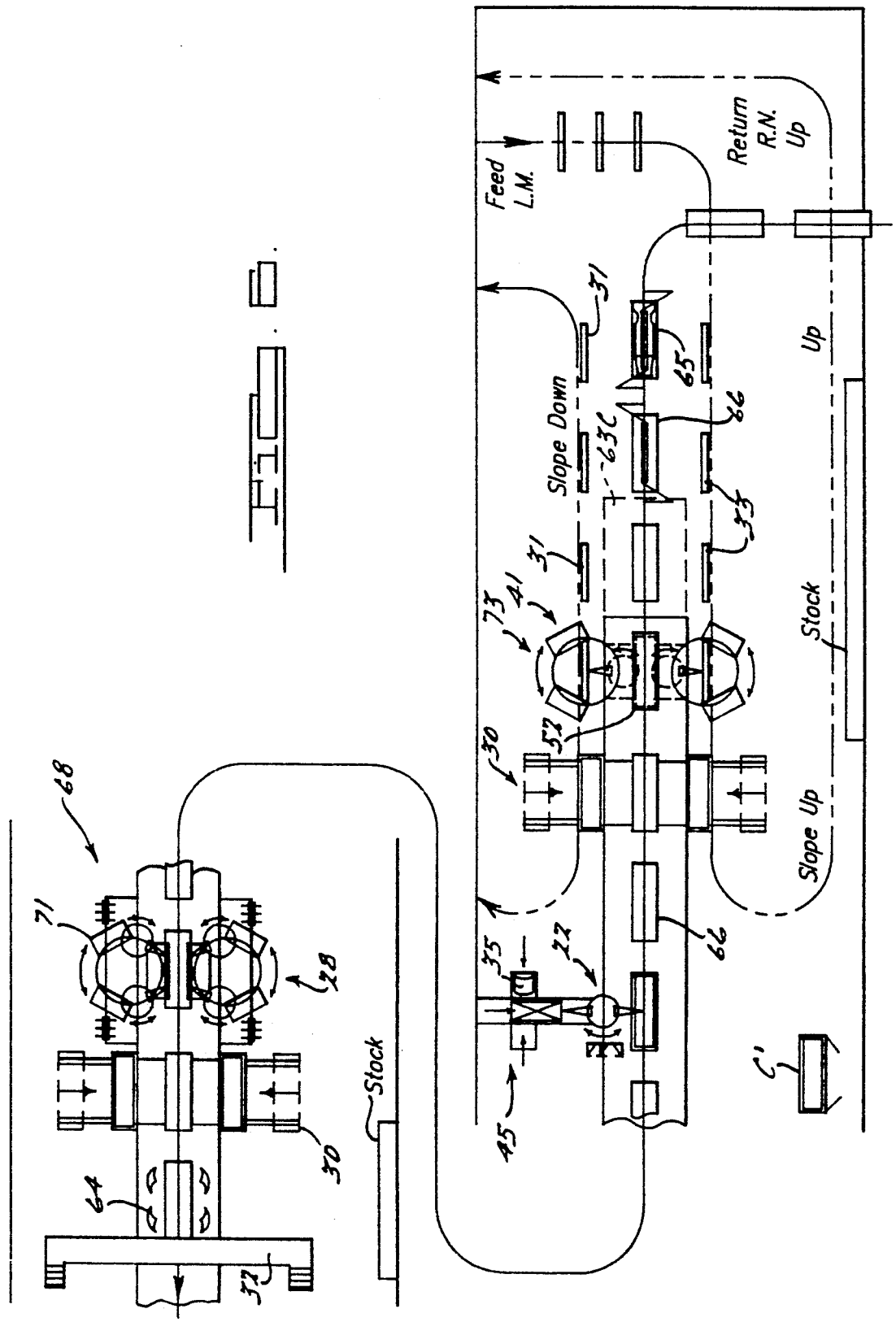

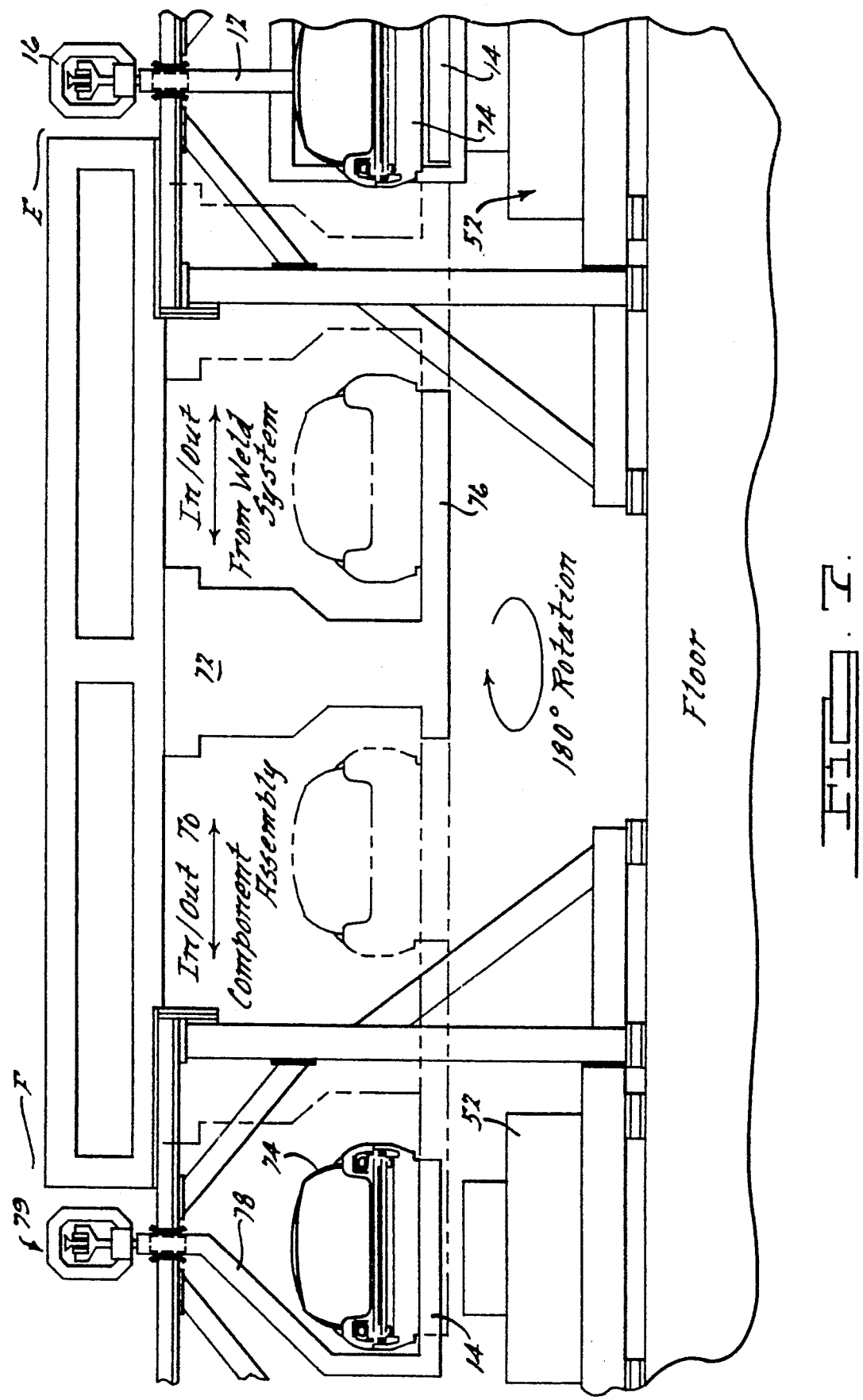

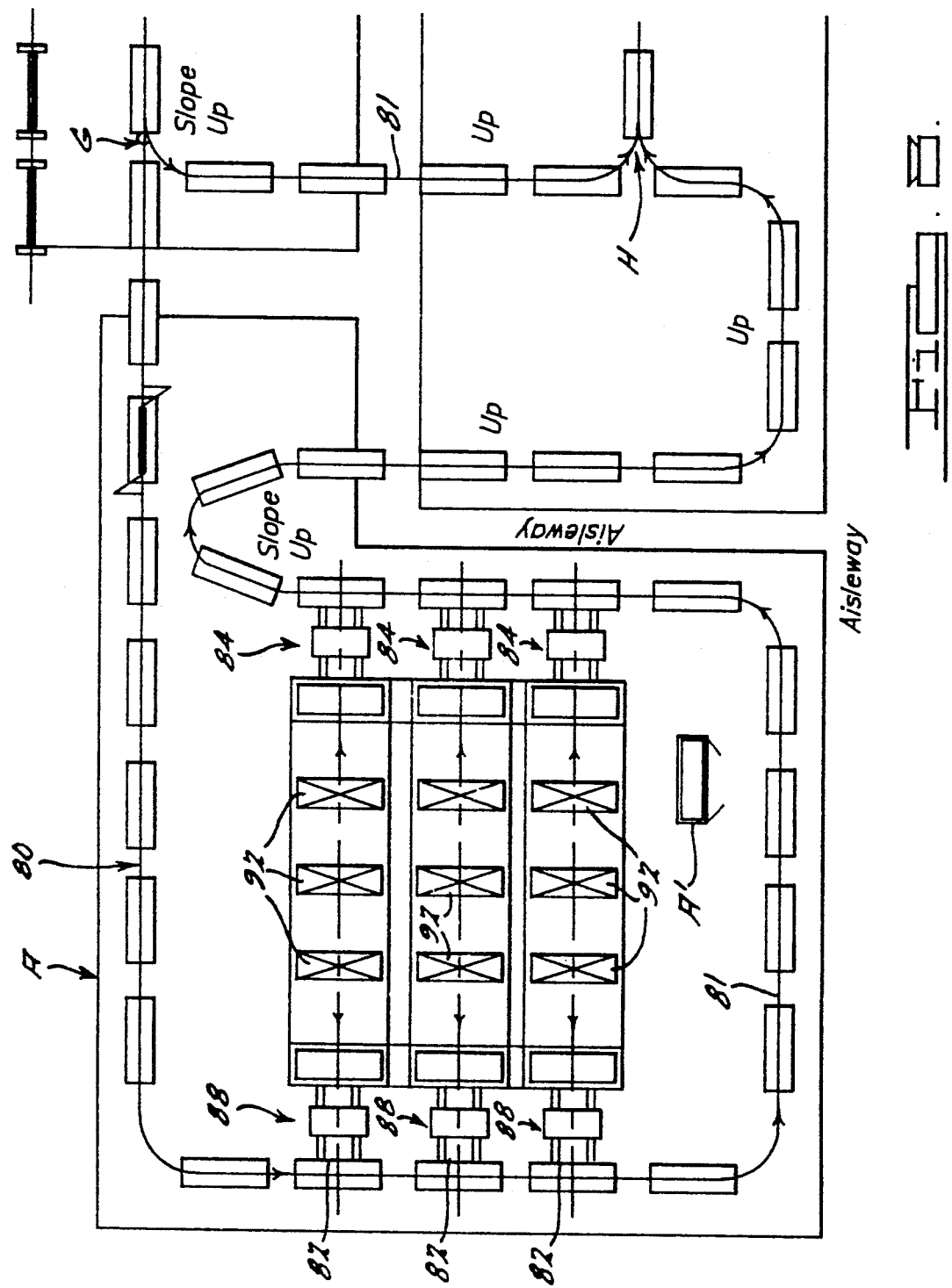

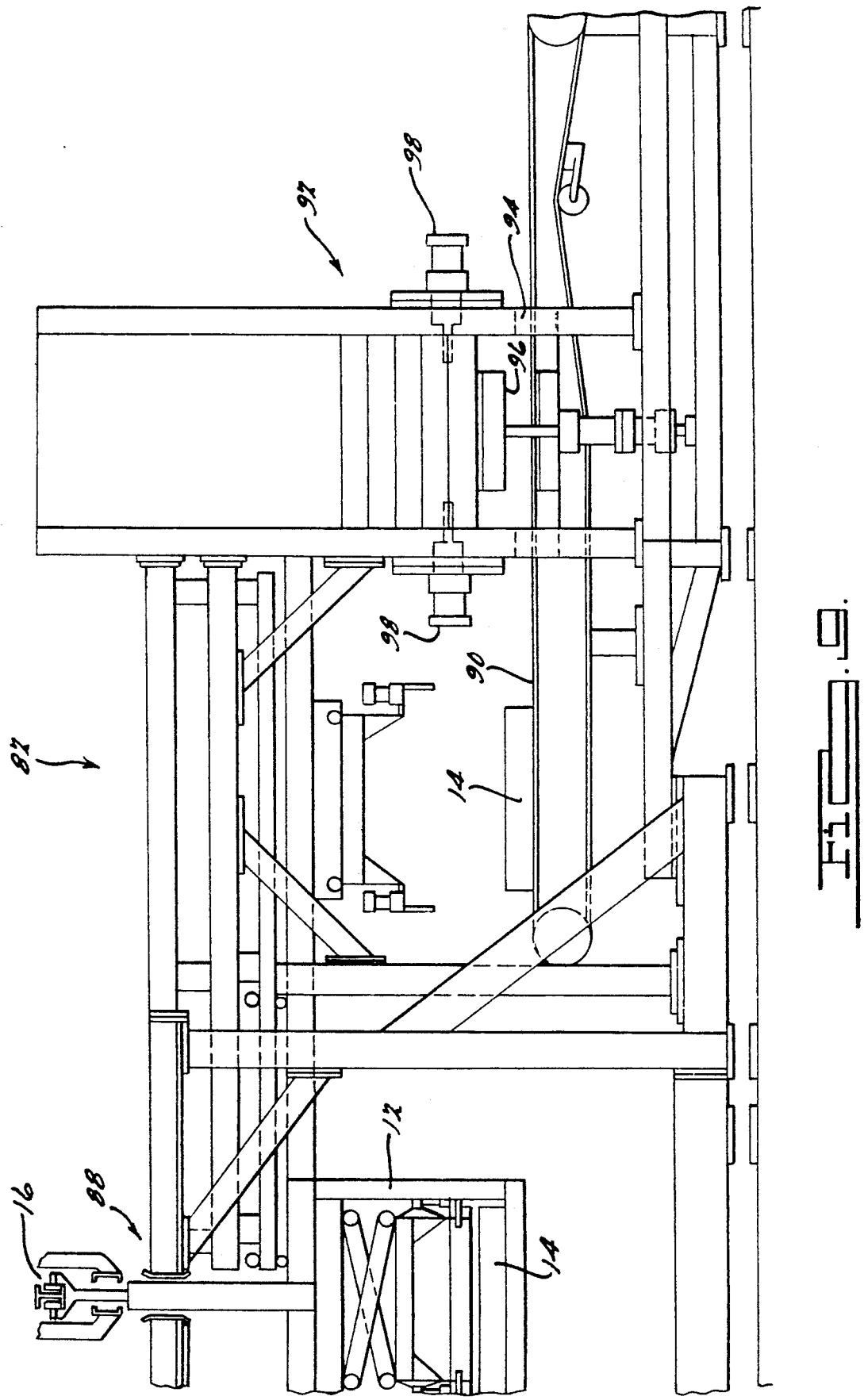

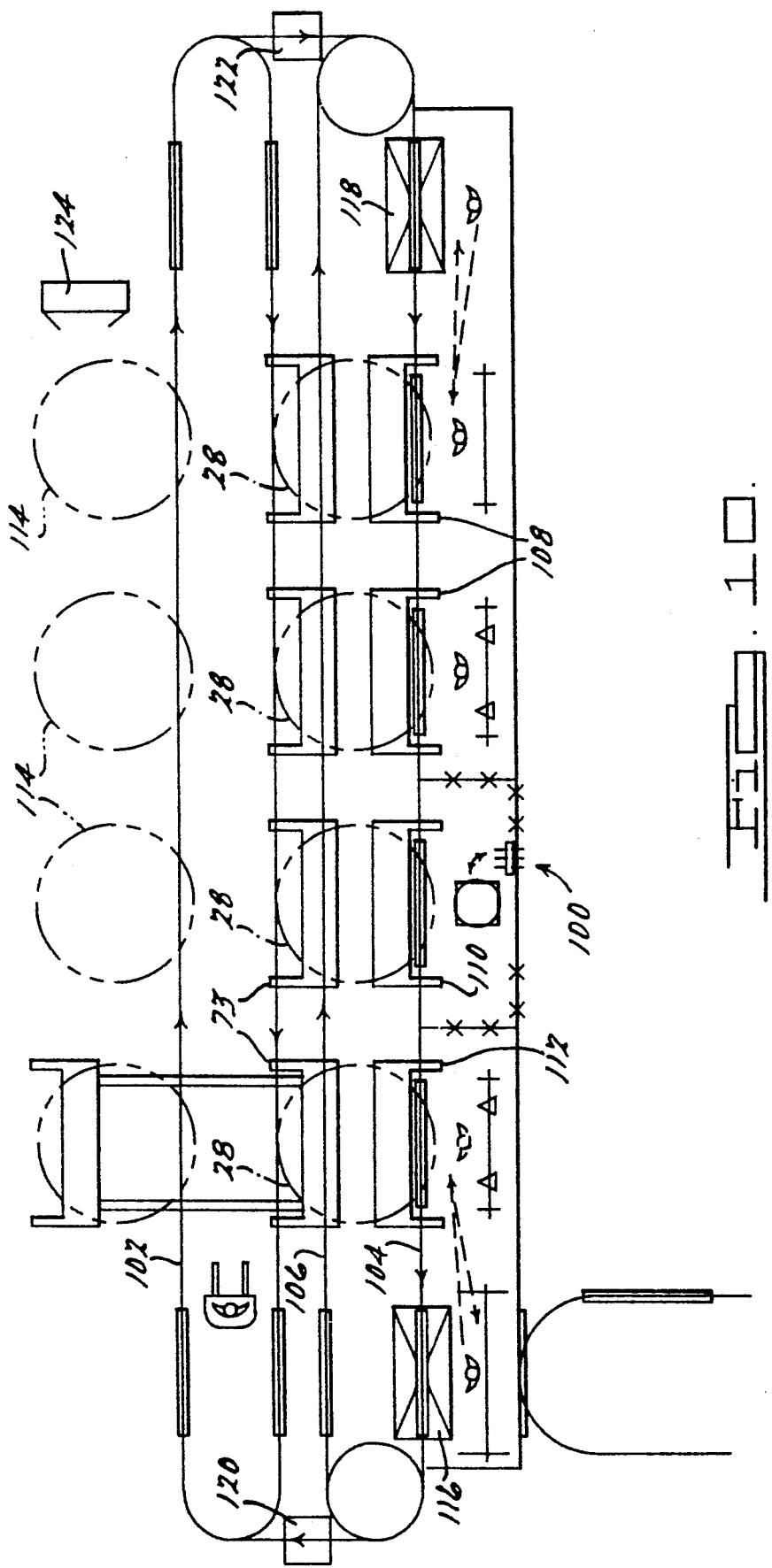

NON-SYNCHRONOUS ASSEMBLY SYSTEM

This is a continuation of the U.S. patent application Ser. No. 07/493,506, filed Mar. 14, 1990 and now abandoned, which is a divisional of Ser. No. 07/259,216, filed Oct. 18, 1988, now U.S. Pat. No. 4,928,383, entitled, Non-Synchronous Assembly System.

FIELD OF THE INVENTION

The present invention relates to a product assembly system and method of assembly. More particularly, this invention concerns a production line manufacturing system and method wherein a succession of work-pieces is moved past stationary work stations, and the work stations may be programmed to accommodate a variety of work-pieces being processed.

BACKGROUND OF THE INVENTION

Conventional process assembly lines consist of a number of stationary idle and work stations, each of which perform various loading, joining or sealing operations simultaneously. These work stations are generally connected by a reciprocating, straight-through shuttle line. The shuttle receives all of the product, transfers them from one station to the next synchronously, and a single, pre-determined series of operations is performed on each product as it is shuttled through the line.

This type of assembly line concept is best suited for an undifferentiated product, and is not conducive to model or product mix or any type of variety in the product. An example of model or product mix may be as dramatic as truck bodies and car bodies in an automotive assembly line, or as subtle as a new (or prototype) model of the same style car. Similarly, it is contemplated that the system may be used to manufacture products as disparate as snow-blowers and tractors tractor the same line. Typical synchronous assembly lines require major and expensive rework to accommodate such model mix, if changeover is at all feasible.

Capital expenditures, operating costs, floor space, and product mix have made it increasingly necessary to provide flexible assembly systems. However, many of the sophisticated "factory of the future" concepts implemented to date require expensive maintenance, and a high level of technically qualified personnel to operate them. Such systems often defeat the economic and technological advantages they at first seem to provide. Robotic vehicles, A.G.V. (automatically guided vehicles), flex-systems, etc., although successful in some operations, have not always proved practical and or maintainable for many manufacturing processes. High degrees of maintenance, frequent operator intervention, high degree of training for operator and maintenance personnel, and total cost reduce the desirability of such systems. Moreover, there remains a proliferation of assembly plants that, because of age, floor space, working capital, and available labor force, cannot utilize these technologies.

Quality is usually a paramount consideration and has become a critical issue in many automotive companies. Therefore, many manufacturers will insist that each sub-assembly be processed in the same work station in order to minimize set-up and to guarantee repeatability. Previous systems containing palletized work stations, wherein each sub-assembly is built up on a different tooling pallet (carousels, turntables, A.G.V's and palletized conveyors) have not been accepted, even though they are flexible, since they do not assure such repeatability.

Production rates also play a role in determining the type of system to be employed. When a low volume model run is considered, many of the available processes are not economical. Further, these manufactures face the added economic problems of model mix and tool changeovers.

DESCRIPTION OF PRIOR ART

There are prior art systems which have to a lesser extent achieved some of the objectives of the present invention, but none utilize the concepts contemplated in the present system. A patent to Kraus, et al (U.S. Pat. No. 4,583,634) demonstrates one attempt to achieve the desired flexibility of processing differing parts in a single line; however, Kraus contemplates a synchronous line which requires a parallel rail conveyor, the use of dead stations, and the special handling of parts that are not to be worked on in certain active stations. U.S. Pat. No. 4,738,387 to Jaufmann et al generally discloses a design for individual processing stations for a flexible manufacturing system, but it demonstrates the problems encountered in transporting products through a non-synchronous line. Tobita et al, (U.S. Pat. No. 4,667,866) demonstrates another attempt to achieve flexibility of assembly, but which requires delivery of a series of parts to a single station. U.S. Pat. No. 4,548,346 to Kraus et al discloses a system which utilizes multiple tooling stations but which illustrates the inflexibility of existing systems. Thibault et al, (U.S. Pat. No. 4,411,354 discloses a transport system for a manufacturing line, but also illustrates the inherent inflexibility in typical assembly systems, particularly those utilizing robot assemblies. Other references exist which indicate that individual components such as automatic clamps, suspended transportation, lifting devices, pallet carriers and changers, assembly tooling, and accelerating conger systems are all known in the art. However, the particular non-synchronous assembly system of the present invention is not disclosed or suggested in these references.

OBJECT OF THE INVENTION

It is the object of the invention to provide a permanently installed, reusable power and free transport system, with changeable work station apparatus and programmable controls. The system will preferably utilize commercially available flexible robot devices, quick change dedicated tooling, flexible transport product carrier, and state of the art joining techniques.

Another object is to provide a manufacturing process which can accommodate model mix and can be quickly retro-fitted to run prototype parts without interrupting current production. Further, the system can preferably accommodate complete new model year changeovers, utilizing the same basic assembly components.

A further object is to provide for low or high production volumes, and for manual as well as automatic assembly operations. A final object is to show that by repeated use of the same basic components throughout the system, a cost advantage as well as simplified maintenance will be realized, and spare parts inventory minimized.

SUMMARY OF THE INVENTION

The present assembly system provides a means for conducting a variety of series of sequential operations on a variety of products. Although its initial contemplated use is in the assembly of automobiles, the principles embodied in this system are not so limited. Generally, the system involves transporting a part or product through a series of work stations. Each of the work stations is programmable to: a) select an operation to be performed, and b) to perform the operation or not. In this manner, a part or product may only be exposed to a fraction of the operating capacity of the line, and a different product may be run through the same line and be exposed to a completely different series of operations. Therefore, two entirely different products could be processed consecutively on the same line, such as different models of cars.

The system of the present invention may be particularly well suited for applications other than automotive assembly lines. One example might be an assembly line which could interchangeably run lawn mowers, snow blowers, tractors and motor cycles. Other potential uses include, but are not limited to, assembly lines for toys, appliances, farm equipment, and vehicle vehicles parts such as motors or carburetors. In such instances, a single line may be used to produce a variety of products, either interchangeably or through rapid successions of limited runs. Any tool changes could be scheduled so that production would not be interrupted. Once the initial investment in the system has been made, the only required investment in adapting to a product change would be the cost of the required tooling.

In typical operation, constant variation of products is not often necessary or preferred. However, often changeovers may be desired for prototype runs or for small quantity runs. In such instances, the necessary tooling can be installed along the line during the main production run. The prototype run or small quantity run can be processed without ever stopping the line, and the main production run can be resumed immediately thereafter. Similarly, the necessary tooling changes for a new major production run (such as a new model year) could be made before the previous production run was finished. Thusly, a major changeover could be effected without any loss of production time.

The assembly system of the present invention generally comprises: product container automatic exchange systems, industrial robots with flexible tool exchanges, multi model tool exchange turntables, multi-model tool exchange shifter systems, flexible product load-unload devices, universal support hook buffer areas, product carrier exchange and storage systems, and commercially available overhead transport system.

The system methodology is centered around a reusable transport, preferably a commonly used power and free conveyor, but the system is not limited to only this type of transport. Individually powered trolleys and inverted power and free transports can also be used.

Where high production rates are required, an optional programmable trolley indexing mechanism may be utilized to pick up on demand a disengaged trolley and automatically accelerate, transfer and decelerate it through the system work stations, to be eventually reunited with the original conveyor pusher dog system. Due to the programmability of the system, the shuttle is capable of emptying the assembly line from a given station forward, therefore acting in a non-synchronous (i.e., asynchronous) manner.

Suspended from each trolley is a universal support hook, designed so as not to interfere with the actions of the associated flex-tooling, or the loading or unloading of the product. On each hook is an exchangeable product carrier or pallet which is for transport only and is not used for final location of the product when loose sub-assemblies are being joined.

The products are transported through a series of work stations. At each work station at least one preprogrammed decision is made. Any of the work stations may actually comprise a plurality of work stations. This may be effected through the use of tool exchange turntables or shifter systems which are known in the art. The turntables or shifter systems may be adjusted between consecutive parts. Thus, each work station may execute either a variety of operations or the same operation on a variety of parts. In the latter case, the turntable or shifter system may contain several identical tooling systems which are individually calibrated to work on slightly different models. This allows different models to be processed without any down time for adjustment for the tooling. It also provides a back-up system should major maintenance be required.

The use of a power and free transport system allows for a further variety of options available to the user. The present system may be integrated into and out of an existing power and free conveyor system, and may be connected by spurs into and out of larger plant storage systems. The system further allows for the build-up of a trolley and carrier "buffer" prior to the entrance of an assembly system or to a work station. This will protect against temporary interruptions affecting the normal flow of the carriers from one station to the next. An important feature of the present system is the option to divert a trolley and carrier at the entrance of the assembly system and to insert a different trolley and carrier thereby accommodating increased model selection or customized prototype runs etc.

An important advantage of the invention is that each of the load and work stations in the system utilize the same basic components, other than the particular model dedicated tools. Thus the control system is less complicated, less personnel and technical training are needed, maintenance is simplified, and less multiplicity of tools, spare parts in inventory is needed. Further, since there are fewer types of machines in use, operators may be familiar with more of the machines, and personnel scheduling flexibility is increased.

At the completion of assembly, the product can be easily unloaded from the carrier and reloaded onto other conveyor hooks or transport devices. The hooks and carriers would then typically be circulated into the system for another cycle. If required, however, a hook and carrier can be diverted upon reaching a system decision point to a carrier exchange system. Once there, the carriers can be simply removed and stored for future use. The empty hook would then continue on to a load station where a new model carrier may be retrieved from storage and loaded on to the universal support hook and queued for entry into the manufacturing system. The insertion of a different model may occur without losing or in any way disturbing the current production.

DESCRIPTION OF THE DRAWINGS

The accompanying drawings will detail the above advantages and features in which:

FIG. 2A is a plan view of a universal support hook and carrier;

FIG. 6 is a plan view of a body framing sub-system;

FIG. 7 is a front view of a "body in white" unload station; taken along line 7—7 of FIG. 1

FIG. 8 is a plan view of a product carrier exchange station and buffer zone;

FIG. 9 is a front view of a product carrier exchange work and storage station; and FIG. 10 is a plan view of an alternate example of an assembly system according to the present invention.

In addition to the main system example provided, an auxiliary body sides sub-system is exhibited to show the inventions versatility and the advantage that can be realized within off line systems as well.

SPECIFIC DESCRIPTIONS

Figure 1:
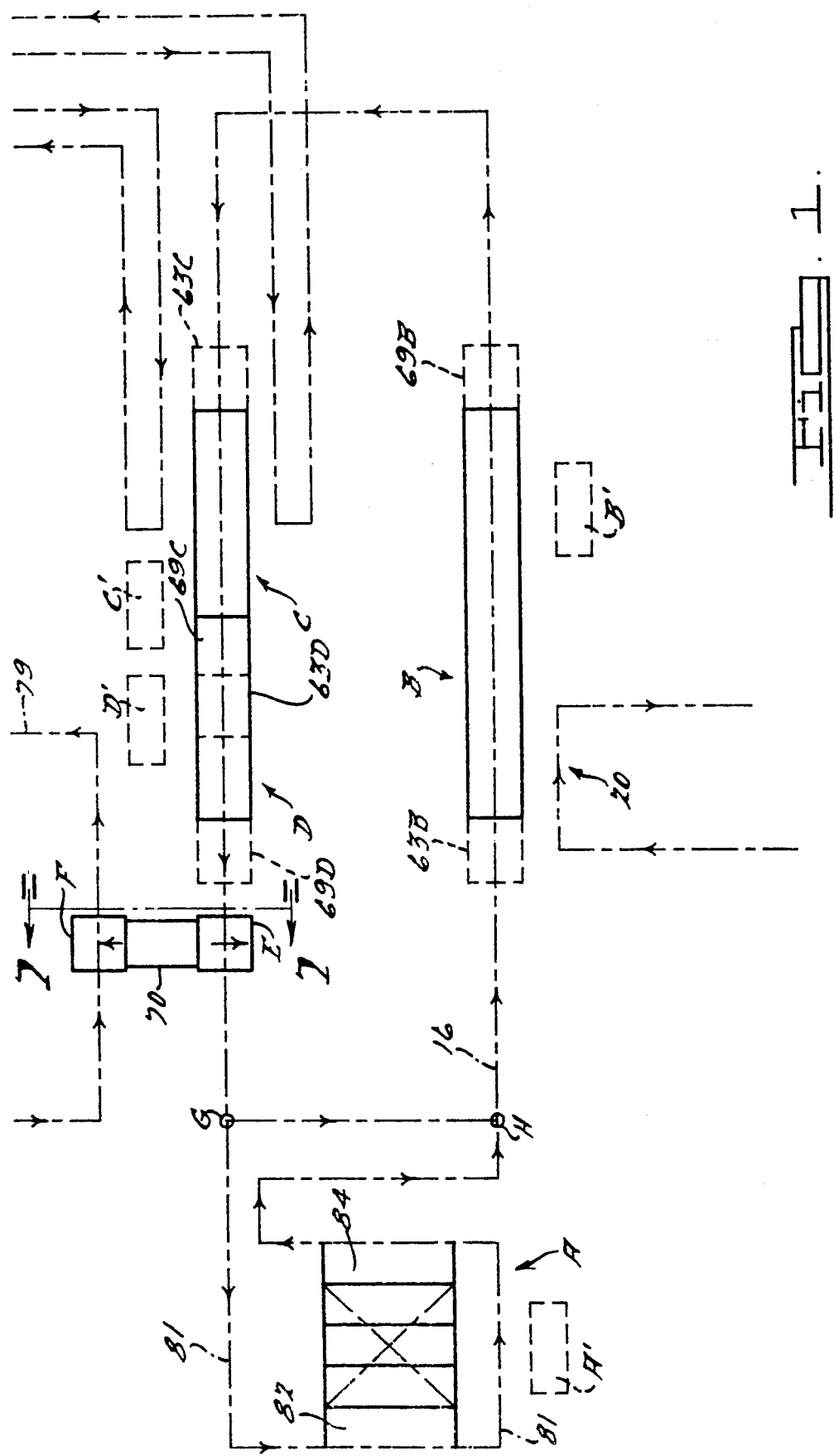
FIG. 1 is a small schematic plan view block diagram of an entire system according to the present invention.

FIG. 1 shows a schematic view of one contemplated use of the assembly system of the present invention. Area A is the carrier storage and exchange area shown in greater detail in FIGS. 8 and 9. Area B is an underbody sub-system assembly for an automobile with an associated overhead delivery system for an automotive engine compartment. Elements marked with a "prime" indicate the controllers for the associated sub-system; for example, B' is the controller for the underbody sub-system B. Areas C and D are body framing sub-system assemblies for an automobile, with associated delivery systems for an automobile body sides. Area E is a transfer system for removing the completed automobile body (body in white) from the assembly line. Area F is a transfer system for transporting the completed automobile body to another system, such as a paint shop. Points G and H indicate decision points in the transfer system. If a carrier is to be recycled into the line, it will not enter area A. If a new carrier is to be utilized the carrier to be recycled will exit the system at point G and enter area A, and a new carrier will exit area A and enter the line at point H.

Figure 2:
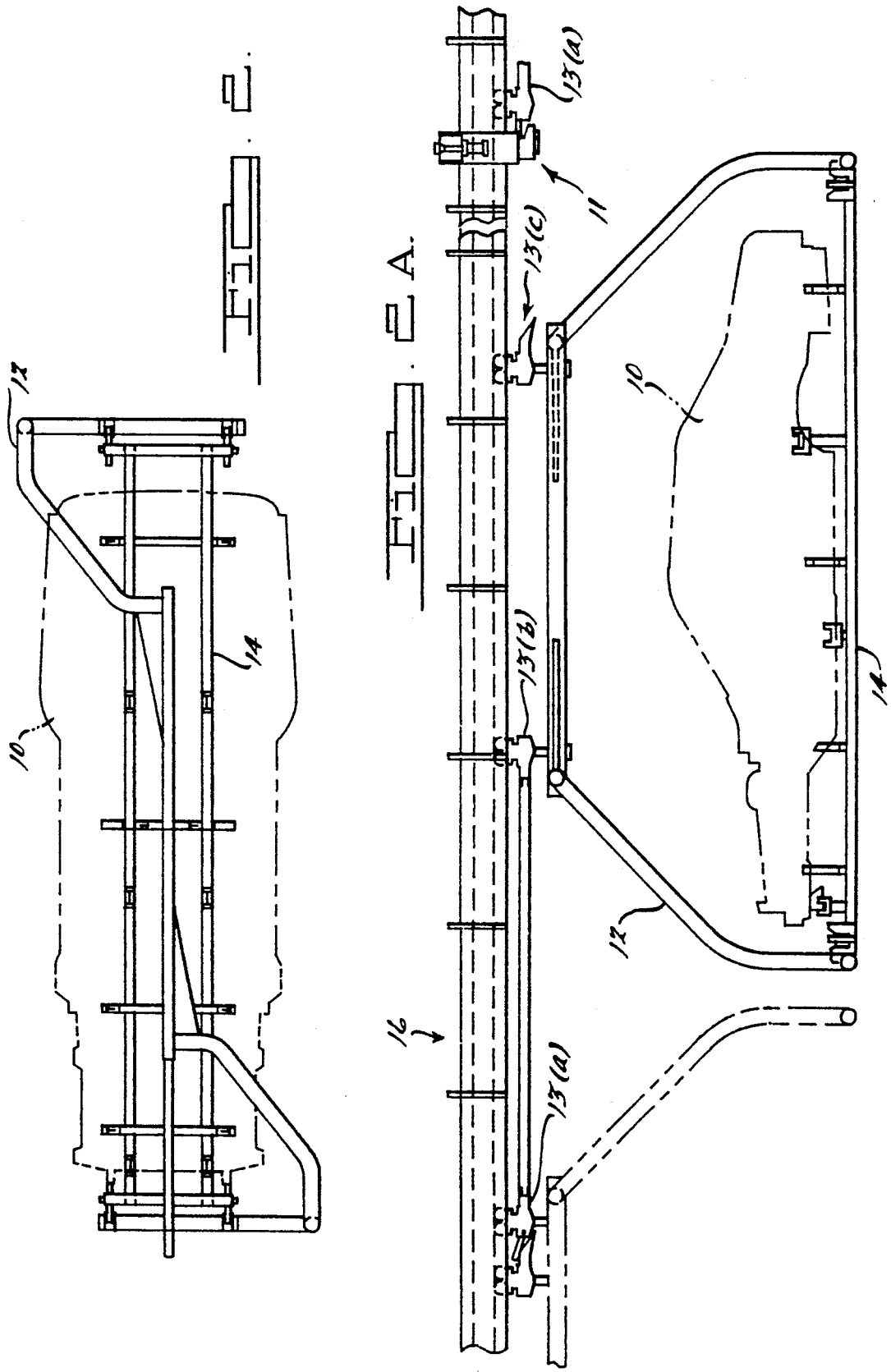
FIG. 2 is a side view of a universal support hook and carrier.

FIGS. 2 and 2a show the plan view and front view, respectively, of a automobile body 10 (here complete) being transferred by a hook and carrier assembly including a hook 12 and a carrier 14. Also illustrated is a typical overhead power and free conveyor system 16. The conveyor consists of an upper power track and chain mounted pusher dogs, including a lower rail which supports individual trolleys. These engage and disengage from the pushers by cam actuated mechanisms on the trolleys, or independently actuated trippers in the work stations.

The hook 12 is a suspended plurality of trolleys 13. As shown in FIG. 2(a), the lead trolley 13(a) having a trailing end 13(b), is configured to mate with the rear trolley 13(c) of the preceding assembly so that assemblies will not collide should a preceding trolley be stopped for any reason. This is particularly useful in the buffer zones where assemblies can be accumulated, whether to allow for varying rates of operation at different stations or to allow for temporary station shutdowns, such as for minor repairs or recalibrations. Also included is an air actuated remote engagement mechanism 11, which can engage the lead trolley 13(a) to hold an assemble in place at select points through the system as necessary.

The hook 12 is configured to provide the necessary clearance for the operations to be conducted at each station. As is further described herein, each hook is loaded with a selected pallet or product carrier 14 in the carrier load section of the carrier storage and exchange area A. The carrier 14 is configured to be processed by a predetermined series of stations and work pieces, and is located onto the hook by means of guide pins and bushings.

Figure 3:
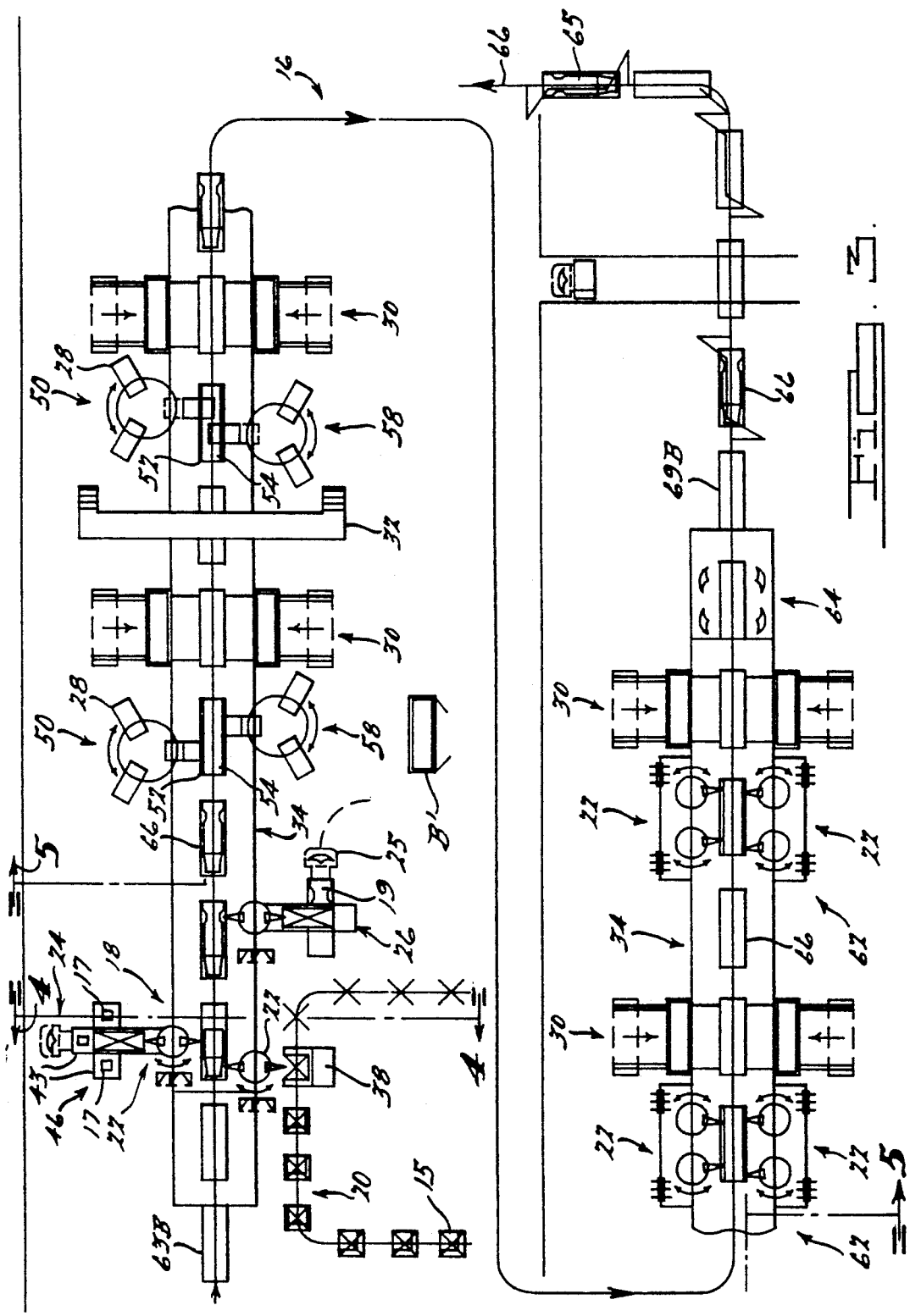
FIG. 3 is a plan view of an underbody sub-system.

FIG. 3 is a plan view of an underbody subsystem assembly for an automobile body illustrated as area B in FIG. 1. Illustrated as an example is one specific assembly process. It will be appreciated that the tooling exchange techniques can be readily adapted for other applications. The hook and carrier assembly enters a load station 18 for loading an engine compartment 15 and a front floor pan 15 (see FIG. 4). The engine compartment is delivered by conveyor means 20 and loaded by a loading tool, such as an industrial robot 22. Similarly, front floor pans 17 are delivered by delivery means 24 and loaded by a robot 22. The hook and carrier assembly will then be advanced to the next work station 26 where a rear floor pan 19 will be delivered by delivery means 25 and loaded. Various assembly operations are performed as the hook and carrier assembly transports the transforming autobody through the assembly line, important aspects of which are discussed in detail herein.

FIG. 3 also demonstrates the repeated use of standard tools such as robots 22, tool exchange turntables 28 and tool exchange shifter systems 30. Also illustrated are walkways 32 to allow operator access to all portions of the line, and an idle work station 34 to allow accumulation of assemblies without slowing production.

As a trolley and carrier reach an "assembly system enter zone", the first trolley is held back and disengaged from the powered pusher dog by a independent actuator and sensor switch. Each subsequent trolley is held back until the first trolley has re-engaged with the powered pusher so signaled by the system controller, or is engaged to the programmable trolley index mechanism.

Figure 4:
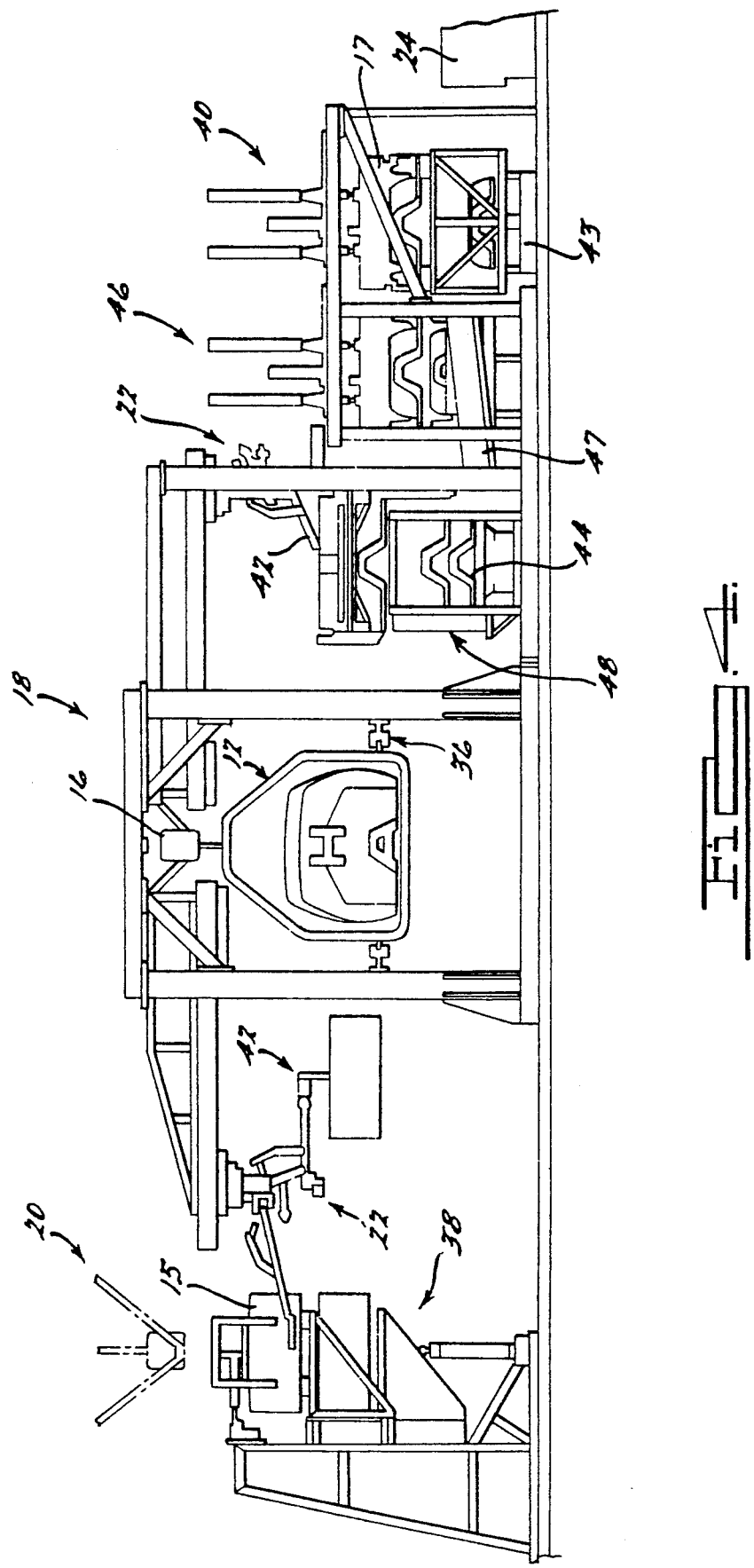
FIGS. 4 and 5 are front views of typical underbody load and work station taken, respectively, along lines 4—4 and 5—5 of FIG. 3.

FIG. 4 illustrates a universal support hook 12, and exchange product carrier 14 in a load station 18 for loading the engine compartment 15 and the front pan 17. The hook 12 is disengaged from the transport system 16, and the transport support hook lock and positioner 36 engage the hook 12 itself. Thus, the hook is properly located and locked into place. The engine compartments are delivered to the load station 18 in model select order via an overhead conveyor spur 20. The correct model is verified by the control system B' shown in FIG. 1. If the wrong model is sensed the conveyor continues on to a reject unload station.

Upon sensing that a correct model engine compartment is in the load station, a lowering elevator 38 will unload the part from the hook and lower it. An industrial robot 22 that is equipped with an automatic tool change end effector 42, will pick up the product, verify it, and then proceed to load the engine compartment directly onto the carrier 14. The tool change end effector 42 is automatically adjustable to allow for unique styles and models.

The front floor pans are delivered to the load station 18 in pre-loaded product container 44. In this instance a container shifter 42 is shown, that will allow the choice one of three available model containers 44 to be positioned for part pick-up by an overhead industrial robot 22 with an exchangeable end effector 42. If only one model is being run, all three shifter positions may be loaded with the same model containers 44, thus ensuring product availability. On the other hand, product containers 44 can be loaded on and off the shifter 42 without disturbing on-going production.

The front pan is picked up by an overhead lift shuttle and load mechanism 46. The overhead lift 46 is equipped with grippers or suction cups, safety clamps, and programmable lift actuators, which will sense the next stocked part in the product container 44. The parts will be deposited on a floor conveyor 47 and stored in a vertical accumulator system 48, until picked up by the industrial robot loader 22. The pan will then be loaded directly onto the previously loaded engine compartment.

Once the load sequence is complete and an all-clear-to-transfer signal is received, the support hook 12 will be automatically unlocked by the automatic locking mechanism 36, and re-engaged with the conveyor transport system 16. The hook 12, and carrier 14 will then be transferred to the next station.

The next station 26 of the underbody system B shown in FIG. 3 will load a new pan (i.e., a rear floor pan 19 in the same manner as explained in the above front pan sequence.

Figure 5:
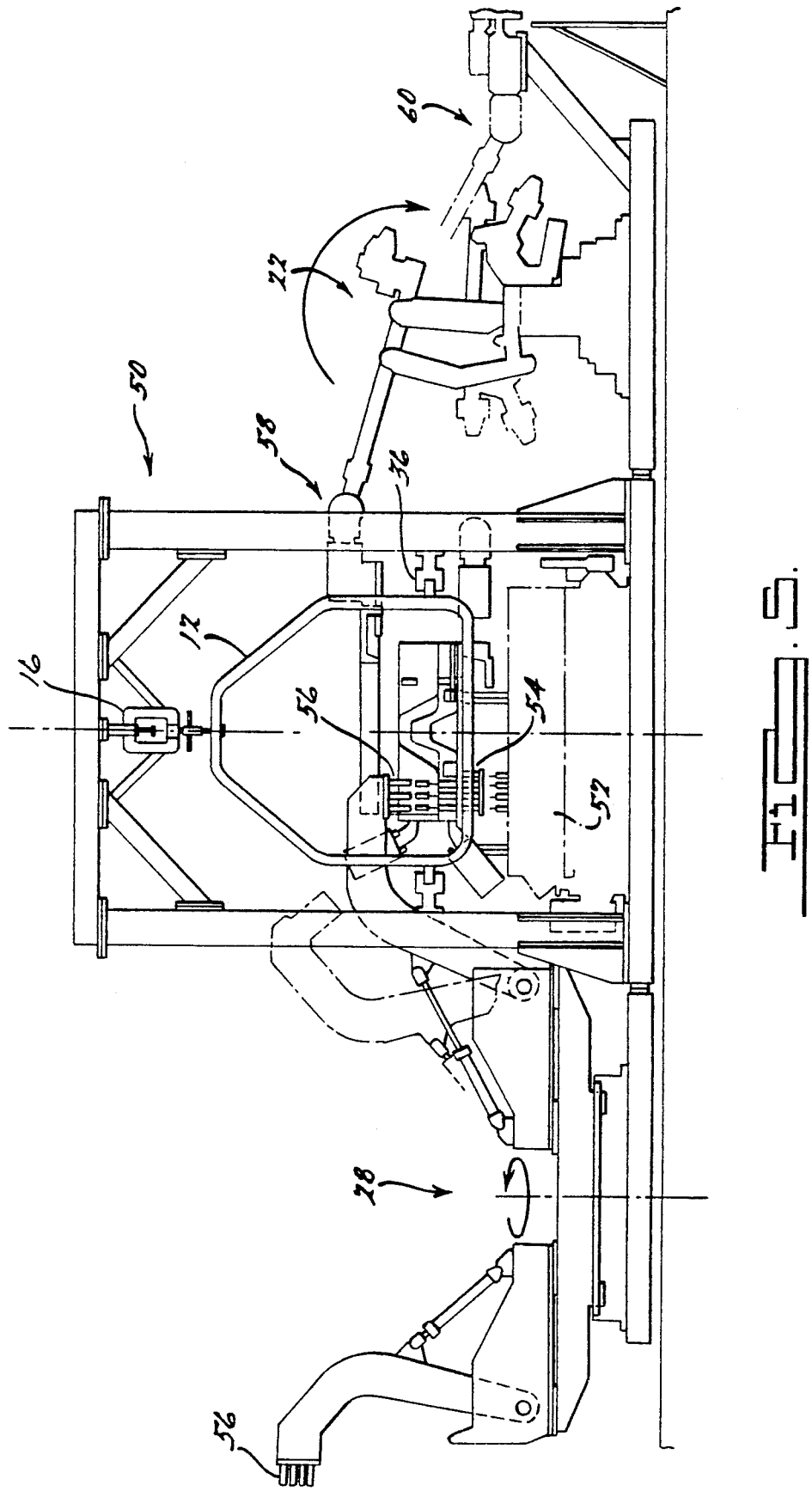

A variety of work stations are located along the underbody assembly system as shown in FIGS. 1 and 3. FIG. 5 depicts two work stations provided at different locations along the assembly line with the view to the left of the parting plane being a dedicated tack and weld station 50 and the view to the right being an underbody weld station 62. The dedicated tack weld station 50 depicts a complex underbody locate, clamp and tack weld operation, which contains many technical operations achieved individually in the other work stations outlined in FIGS. 2 and 6.

In FIG. 5, the universal support hook 12 is positioned and locked in place by the automatic locking device 36. A lift table 52 located under the carrier 14 will support one of three underbody sub-assembly tooling fixtures 54.

Each fixture 54, supported on the lift table 52, is capable of raising a particular model clear of the carrier 14. The fixture 54 will then locate and clamp the loose sub-assemblies. This will ensure that all of the underbodies of that particular model are joined together on the same tool, thus guaranteeing the accuracy and repeatability of the product.

The storage area for the idle lower tooling fixtures 54 is in the idle station immediately downline of the work station. The selected lower fixture 54 is loaded and unloaded onto and off of the lift table 52 on demand. The required utility connections are made automatically. The lower fixtures 54 are stored on a lateral tooling exchange shifter 30, shown in FIGS. 3 and 6. The idle lower fixtures 54 will now become accessible for maintenance and removal even though the assembly line is up and running. This feature also helps to economize on length and adds to the overall flexibility of the system.

The lower locate, clamp and weld fixtures 54 work in conjunction with the exchangeable upper clamp, locate and weld fixtures 56. These upper fixtures 56 are mounted on a multi-position fixture exchange turntable and storage system 28. For the purpose of example, only two fixtures 56 are shown in FIG. 5, which can be alternatively engaged by rotating the turntable 180°. The fixture 56 toward the station is shown in two positions, 1) retracted, and 2) in operation. The control system B will automatically match the required upper fixture 56 to the lower fixture 54. The storage positions shown for the idle upper fixtures 56, afford the same maintenance, and removal accessibility advantage explained above for the lower tooling.

FIG. 5 also shows a automatic weld gun and transformer attached to a tool exchanger 58 which in turn are mounted to an industrial robot 22. Also shown is a weld gun and transformer in an idle storage position 60. Thus the robot 22 can automatically exchange the gun depending on the work to be done, and the particular model production run. The robot program would be automatically selected by the underbody control system B.

Once the work sequence is complete and an all-clear-to-transfer signal is received or the station ahead is clear, the support hook 12 will be automatically unlocked and re-engaged with the conveyor transport system 16 and the hook 12 and carrier 14 will proceed on to the next station as required.

After leaving the dedicated tack-weld work stations 50 the hook 12 and carrier 14 will proceed through the underbody re-spot weld stations 62. As shown in FIG. 3, these stations are equipped with the same basic components and flexible locate and clamp tooling as previously shown. An a underbody back-up manual weld station 64 will be situated. Current sensors in the re-spot weld station 62 will sense, and signal ahead when a welder has not fired, allowing for pick-up in the back-up manual weld station 64.

Upon leaving the last work station in the underbody subsystem assembly in the area B, the hook 12 and carrier 14 will contain a completed underbody 65. The assemblies will then pass through leave station 69B and will enter a buffer area 66. This area will stockpile underbodies and protect against temporary interruptions between the underbody system and the body framing subsystems C and D, FIG. 1.

As shown in FIG. 6 the universal support hook 12 and exchange product carrier would in this instance reach the body framing sub-system 68 and a new process sequence would begin, utilizing the same basic components as were used in the previous underbody system. The product container shifters 42, the lower lift tables 52, the lateral tooling shifter and storage system 30, the multi-position fixture exchange turntables and storage system 28, as well as the industrial robots 22 and exchangeable end effectors 42 would be basically identical, thus simplifying maintenance, operation and spare parts inventory for both sub-systems.

The body framing sub-system will now only be generally described. The carrier assembly will enter a right-hand and left-hand body side load and tack-weld station, where an industrial robot 22 and an exchangeable end effector 42 will unload a side panel from an overhead conveyor delivery system 16 directly onto and exchangeable body framing locate clamp and weld fixture. The product will be clamped and loaded onto the previously lifted and tooled underbody assembly, where auto weld guns weld the right hand panels 31 and left hand panels 33 to the underbody. The carrier assembly will then advance to a roof load station 45, where a roof 35 will be picked up from a vertical accumulator by an overhead roof loader and delivered and placed onto and attached to the waiting body. Discrete model roofs will be handled by a product container shift and storage system 42. The hook and carrier assembly will leave the roof load station and enter a body framing and roof tack weld station 68. The hook 12 and carrier 14 will be located and locked and the exchangeable lower locate and clamp fixture supported on the lower lift table will raise the product clear of the carrier. Body framing gates 71 will pivot up to locate and clamp the auto body into position, and auto-weld guns mounted on the gates and the industrial weld robots with their exchangeable end effector attached weld guns will effect the welding operations.

Back-up manual weld stations and back-up manual assembly stations appear throughout the line to provide quality control assurance capability. When this sequence is finished a completed body in white assembly will depart this station.

Once all of the assembly operations have been completed, the hook 12 and carrier 14 travel into the "body in white unload station" 70, illustrated in FIG. 7. Here the universal support hook 12 will disengage from the overhead transport system 16. It will be positioned and locked and the lower lift table 52 will raise the completed body in white assembly off of the carrier 14. A body in white unloader-load mechanism 72 would shuttle on rails under the body 74 and when the lift table 52 lowered, the body 74 would be lowered onto the unloader rails 76. The unloader 72 would shuttle out, rotate 180° and deposit the body 74 onto a lift table 52 of load station and the reverse of the unload sequence would take place, depositing the body 74 onto the body component system hook 78, or another transfer mechanism such as an A.G.V. (i.e., automatically guided vehicle). Thus, the body in white may be transported by a conveyor system 79 to a paint shop or other assembly operations.

Upon leaving the body in white unload station 70, the empty carrier 14 and hook 12 will reach a decision point G within the transport system. At this point sub-system programmable controller D sends the assembly back through the underbody sub-system B or detours the hook and carrier assembly into the product carrier exchange and storage buffer system A. See FIGS. 1 and 7. This decision will be made according to the production model sequence required.

FIGS. 8 and 9 illustrates the product carrier exchange loop 80 which contains a buffer area 81 prior to both the unload station 82 and the load stations 84 as well as after the load station. Once the hook 12 and carrier 14 are in the exchange loop the hook 12 will travel to the pre-selected carrier unload stations 82. Although more or less unload stations may be utilized, for the purpose of example, three have been chosen. Once the hook 12 and carrier 14 are at the unload station, the universal support hook 12 will be disengaged from the overhead transport system 16, and the hook position and lock mechanism 36 will engage. An overhead carrier pick-and-place mechanism 88 will pick up the empty carrier 14, rotate it 180°, and deposit it on a floor conveyor 90. The carrier will then be transported to the appropriate product carrier vertical storage accumulator 92 until it reaches the stop 94. A dual position lifter 96 will raise the discarded carrier up under the stack of previously loaded carriers and the support actuators 98 will disengage. The dual position lifter will continue to rise, now lifting the entire stack of previously loaded carriers. The support actuators 98 will then re-engage, supporting all of the empty carriers in the accumulator 92. The reverse sequence will unload empty carriers from the storage bank.

The now empty hook 12 will leave the unload station and travel through the buffer zone and into the carrier load station, where a new model carrier 14 will be loaded onto the empty hook 12 by the reverse of the above outlined unload sequence.

The carrier 14 and hook 12 will travel on through the buffer zone in the carrier exchange loop until they reach the decision point H and re-enter into the underbody sub-system B, where it will receive new unique model components without interrupting the current production run. As the carrier reaches a load or work station, the program control will automatically match the appropriate locating and clamping tooling fixtures.

The versatility of this invention is further illustrated by the application of the concept to the self-contained body side sub-assembly system 100 shown in FIG. 10.

In this embodiment a modified variation of the exchange product carrier and universal support hook are suspended from a small self-contained upper and lower power and free transport system 102, 104 and 106 which comprises a power and free storage loop 102, a carrier delivery line 104, and an upper return loop transport system 106. The carrier delivery line 104 shuttles the exchange product carriers through the in-line work stations similar to the main line system described in connection with FIGS. 1–9. As shown, the line includes a manual load and weld station 108, a robotic respot weld station 110, a back-up manual weld station 112, and idle storage stations 114.

Once the last work cycle is complete, the support hook lock and position mechanism will disengage, and an unload station pusher will advance the hook and carrier into a commercially available elevator 116. Here, the completed body side subassembly (i.e., product) is manually unloaded, and the operator will activate the elevator and raise the hook and carrier. At the top the hook will engage the dogs of the upper return loop transport system 106. The empty hook and carriers will accumulate until they reach the transport system elevator 118 and will descend automatically once the load station below is clear. Once lowered, the operator will manually load new parts onto the carrier.

The work stations in this body side subassembly utilize the same basic components as the previously described mainline systems, including multi-position fixture exchange tables, body sides locate and clamp fixtures; and robots with exchange end effectors. Although manual loading and unloading is shown, these operations can be automatic, as in the manual system.

The individual model exchange product carriers and their respective hooks are stored in the separate power and free storage loop 102. This loop is entered and exited at two transport decision points 120 and 122 upon command from the programmable controller 124. Sensors installed on each carrier, will identify each as to model, and therefore allow the system controller to verify and select the carriers that are to enter and exit the storage loop. Hooks and carriers remain together in the storage loop 106, where they will accumulate in batches until needed. When the time comes for a complete system model change, requiring new carriers, then the existing hooks and carriers will be transported to the unload station where the old carrier will be simply disengaged and replaced on the existing hook with a new model carrier. They will then be transported back into the system, without a major disturbance to the line.

As earlier mentioned, higher production rates would require faster shuttle times through the work stations.

This cannot be achieved with a standard power and free conveyor system. Therefore, a programmable trolley indexing shuttle system may be used to pick-up on demand a disengaged trolley and automatically accelerate, transfer, and decelerate the hook and carrier through the system work stations to be eventually reunited with the original conveyor pusher dogs. Due to its programmability, the shuttle is capable of emptying the assembly line from a given station forward, allowing the line to act in an asynchronous manner. This use of the auxiliary programmable trolley indexing shuttle system, in conjunction with the transport system, serves to tie together a complete transfer and buffer system capable of working within any given production rate.

Although it is apparent that the preferred embodiment of the present invention is well calculated to provide the features and advantages stated above, it will be appreciated that the invention is susceptible to modification, variation, and change without departing from the proper scope or fair meaning of the appended claims.

We claim:

1. A programmable manufacturing process for the production of a variety of models of products, said process being able to accommodate model mix and being adaptable to run prototype models without interrupting current product, the steps of the process comprising:

asychronously transporting a plurality of workpieces along an endless track having a plurality of workstations positioned therealong, said workstations each having at least one automatically positionable tool for performing a manufacturing operation on said workpieces;

preselectively controlling each of said workstations to select a manufacturing operation to be performed, including performing no manufacturing operation at all, thereby selecting a series of manufacturing operations to be performed on each workpiece as it is transported along said track, depending on the model of workpiece and the product to be manufactured; and simultaneously transporting the models of workpieces and performing the same or different series of operations on the models of workpieces so transported.

2. The process as recited in claim 1 including changing the tools at at least one predetermined workstation during the process without interrupting the production steps at that or other workstations.

3. The process as recited in claim 1 including adding additional workstations as the workpieces are being transported.

4. The process as recited in claim 1 including removing the workpieces from said track from a given work station forwardly.

5. The process as recited in claim 1 including supporting the parts to be worked on such that each is transported on a support and disposed in a vertical plane relative to said track.

6. The process as recited in claim 1 wherein at least one work station has a plurality of tooling for performing at least two different manufacturing operations and the process further includes the step of automatically selecting one of said plurality of tooling at each of said at least one work station to be positioned for performing a manufacturing operation on certain of said workpieces.

7. The process as recited in claim 6 including the automatic sequential selection of a plurality of tooling at at least one workstation to perform manufacturing operations upon at least one of said workpieces.

* * * * *

UNITED STATES PATENT AND TRADEMARK OFFICE
CERTIFICATE OF CORRECTION

PATENT NO. : 5,152,050
DATED : October 6, 1992
INVENTOR(S) : Kaczmarek et al.

It is certified that error appears in the above-identified patent and that said Letters Patent is hereby corrected as shown below:

Column 1, line 38, please delete "tractor".

Column 2, line 31, after "4,411,354" insert --)--.

Column 3, line 21, please delete "vehicles".

Column 3, line 46, "multi model" first occurrence should be --multi-model--.

Column 7, line 23, after "19" insert --)--.

Column 8, line 2, "B" should read --B'--.

Column 9, line 38, "D" should read --D'--.

Column 11, line 27, "product" should be --production--.

Signed and Sealed this

Twenty-eighth Day of September, 1993

Attest:

BRUCE LEHMAN

*Attesting Officer*   *Commissioner of Patents and Trademarks*